(12) United States Patent
Strater et al.

(10) Patent No.: US 11,297,125 B2
(45) Date of Patent: Apr. 5, 2022

(54) STEERING BETWEEN CONTENT STREAMING DEVICES USING DERIVED LINK METRICS AND CHANNEL UTILIZATION INFORMATION

(71) Applicant: ARRIS Enterprises LLC, Suwanee, GA (US)

(72) Inventors: Jay Strater, San Diego, CA (US); Gregory Nakanishi, San Diego, CA (US); Michael J. Hartman, Chelmsford, MA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 15/382,966

(22) Filed: Dec. 19, 2016

(65) Prior Publication Data
US 2018/0176284 A1 Jun. 21, 2018

(51) Int. Cl.
*H04L 29/08* (2006.01)
*H04B 17/318* (2015.01)
(Continued)

(52) U.S. Cl.
CPC ........... *H04L 67/04* (2013.01); *H04B 17/318* (2015.01); *H04W 16/28* (2013.01); *H04W 36/08* (2013.01); *H04W 40/12* (2013.01); *H04W 40/24* (2013.01); *H04W 36/26* (2013.01); *H04W 36/38* (2013.01); *H04W 84/12* (2013.01); *H04W 88/08* (2013.01); *H04W 88/16* (2013.01)

(58) Field of Classification Search
None
See application file for complete search history.

(56) References Cited

U.S. PATENT DOCUMENTS 9,252,991 B2 2/2016 Zhang
2006/0073827 A1* 4/2006 Vaisanen ........... H04W 36/0058
455/436

(Continued)

OTHER PUBLICATIONS

PCT International Search Report & Written Opinion, RE: Application PCT/US2017/065198, dated Mar. 16, 2018.

(Continued)

*Primary Examiner* — Hong Shao
(74) *Attorney, Agent, or Firm* — Wenderoth, Lind & Ponack, L.L.P.

(57) ABSTRACT

A wireless gateway for steering a client device between content streaming apparatuses in a wireless local area network (WLAN). The gateway provides an access point (GW AP) including a gateway steering controller configured to determine whether a client device should be steered to a content streaming apparatus based on at least one sample measurement on received signal strength between the client device and the content streaming apparatus and at least one other content streaming apparatus, and conduct steering logic calculations. The steering logic calculations are compared against predetermined thresholds, and said gateway steering controller provides an instruction to steer the client device to one of the content streaming apparatuses based on a difference between the steering logic calculations and the predetermined thresholds. Optionally, the gateway steering controller may also provide band steering as well as signal strength steering.

20 Claims, 9 Drawing Sheets

(51) Int. Cl.
*H04W 16/28* (2009.01)
*H04L 67/04* (2022.01)
*H04W 40/24* (2009.01)
*H04W 36/08* (2009.01)
*H04W 40/12* (2009.01)
*H04W 88/16* (2009.01)
*H04W 84/12* (2009.01)
*H04W 36/38* (2009.01)
*H04W 88/08* (2009.01)
*H04W 36/26* (2009.01)

(56) References Cited

U.S. PATENT DOCUMENTS

| | | | |
|---|---|---|---|
| 2011/0158118 A1* | 6/2011 | Chou | H04B 17/318 370/252 |
| 2011/0235591 A1 | 9/2011 | Iyer et al. | |
| 2012/0275320 A1 | 11/2012 | Iyer | |
| 2013/0095846 A1* | 4/2013 | Brisebois | H04W 16/28 455/456.1 |
| 2013/0259005 A1* | 10/2013 | Kulkarni | H04W 36/30 370/332 |
| 2016/0007278 A1 | 1/2016 | Gupta et al. | |
| 2016/0119819 A1 | 4/2016 | Ardeli et al. | |
| 2016/0249267 A1 | 8/2016 | Ho et al. | |
| 2016/0277956 A1* | 9/2016 | Lindheimer | H04W 36/22 |
| 2016/0353361 A1 | 12/2016 | Jung et al. | |

OTHER PUBLICATIONS

Office Action dated Mar. 22, 2021 in Canadian Application No. 3,046,931.
Communication pursuant to Article 94(3) EPC dated Mar. 26, 2021, in corresponding European Patent Application No. 17832608.8.

* cited by examiner

STEERING BETWEEN CONTENT STREAMING DEVICES USING DERIVED LINK METRICS AND CHANNEL UTILIZATION INFORMATION

1. FIELD OF THE INVENTION

The present invention relates to steering between content streaming devices on wireless communication networks; and, more particularly, to a residential wireless gateway and content streaming apparatuses configured with a gateway steering controller that determines signal strength and steers client devices to the content streaming device having improved wireless connectivity performance.

2. BACKGROUND

Repeaters or extenders are commonly utilized to extend the coverage area of Wi-Fi or wireless networks. Generally, repeaters or extenders work by receiving and amplifying existing Wi-Fi signals from an AP and transmitting the boosted or amplified signal to a receiver within a digital device, such as a, STA. Effectively the coverage area of a given Wi-Fi network can be doubled with the use of a Wi-Fi repeater or extender, extending the Wi-Fi connectivity to far corners of a home or office, different floors, or even to outside proximal locations. When wireless extenders are added to residential Wi-Fi networks to improve the Wi-Fi coverage of a consumer's residential gateway, Wi-Fi client's STAs do not easily re-associate with a new access point (AP). Instead, the STAs tend to remain associated with one AP (in the gateway or an extender) when a closer AP with stronger Wi-Fi link is available. This issue is known as the "sticky client" problem. The mobile devices fail to roam to the best AP because the Wi-Fi airtime is shared among all the devices connected to the wireless LAN (WLAN).

"AP steering" moves a client (STA) "stuck" with a bad connection (low RSSI) on one AP in a residence to another AP with better connection in the residence. While air-time fairness logic provided by chipset vendors mitigates one client "hogging" airtime from others, the client is better off being moved to another AP. Various steering solutions involve "AP steering" of a client conducted by a controller (e.g. in the gateway) to disassociate a client from an existing AP if it has a weak link and force it to find another AP with a strong link. The steering is typically not managed by a network controller, and the chips in the AP do not communicate received signal strength indicator (RSSI) information to the network controller. As a result, these steering solutions fail to provide additional logic criteria in determining whether to move the client.

"Band steering", on the other hand, optimizes channel utilization in a given AP to avoid overloading one band over another band by enabling dual-band wireless clients to connect to less crowded 5 GHz network, leaving the 2.4 GHz network available for those clients who support 2.4 GHz only. Accordingly, Wi-Fi performance can be improved for all clients. When a Wi-Fi environment offers connectivity in both 2.4 GHz and 5 GHz, and clients have both 2.4 GHz and 5 GHz capability, how do network operators balance the load between the two frequency bands. Dynamic ("smart") channel selection may be implemented from chipset vendor, however it typically does not coexist with AP steering, and once again fails to provide additional logic criteria in determining whether to move the client.

There exists a need in the art for a residential wireless gateway containing access points (APs) along with network extenders containing access points (AP), the Wi-Fi performance of client stations (STA) connected to the AP being monitored by gateway firmware through a received signal strength indicator (RSSI) of current STA to AP association capable of steering clients with a poor (low RSSI) AP association to a different AP that has adequate throughput capacity, thereby improving wireless connectivity performance. A need in the art further exists in utilizing logic criteria monitored by gateway firmware in determining whether to move the client.

3. SUMMARY OF THE INVENTION

The invention provides a wireless gateway, preferably for residential use, containing content streaming apparatus. Content streaming apparatuses include access points (APs), network extenders containing access points (AP), repeaters, and other contemplated content streaming apparatus having wireless capabilities. Wi-Fi performance via signal strength of client stations (STAs) wirelessly connected to an AP are determined by gateway firmware through a received signal strength indicator (RSSI) of current STA to AP association. Clients having a poor (low RSSI) AP association are steered to a different AP that has adequate throughput capacity, thereby improving wireless connectivity performance.

In a first aspect of the invention a wireless gateway for a wireless local area network (WLAN) is provided. The gateway comprises a gateway steering controller configured to determine whether a client device should be steered to a content streaming apparatus based on at least one sample measurement on received signal strength between the client device and the content streaming apparatus and at least one other content streaming apparatus. The gateway steering controller conducts steering logic calculations. The steering logic calculations are compared against predetermined thresholds. The gateway steering controller provides an instruction to steer the client device to one of the content streaming apparatus based on a difference between the steering logic calculations and the predetermined thresholds.

Another aspect of the invention provides a content streaming apparatus. The content streaming apparatus comprises an input for receiving an input signal, a wireless controller configured to communicate via wireless with a client device, and receive from the client device a streaming session request for streaming of requested content, at least one tuner, and a controller configured to establish a streaming session with the client device via the wireless controller to send the requested content to the client device in the streaming session. The apparatus also includes network connection circuitry. A gateway steering controller is provided. The gateway steering controls is configured to determine whether a client device should be steered to a content streaming apparatus based on at least one sample measurement on received signal strength between the client device and the content streaming apparatus and at least one other content streaming apparatus and conduct steering logic calculations. The steering logic calculations are compared against predetermined thresholds, and the gateway steering controller provides an instruction to steer the client device to one of the content streaming apparatus based on a difference between the steering logic calculations and the predetermined thresholds.

A method for steering a client device between content streaming apparatuses is also provided. The method comprises the steps of: (1) establishing a connection between a client device and one or more content streaming apparatuses; and (2) performing, with a gateway steering controller, at least one sample measurement on received signal strength between the client device and each content streaming apparatus and conducting steering logic calculations. The steering logic calculations are compared against predetermined thresholds, and said gateway steering controller provides an instruction to steer the client device to one of the content streaming apparatus based on a difference between the steering logic calculations and the predetermined thresholds.

Another aspect of the invention provides one or more non-transitory computer readable media having instructions operable to cause one or more processors to perform the operations comprising: establishing a connection between a client device and one or more content streaming apparatuses; performing, with a gateway steering controller, at least one sample measurement on received signal strength between the client device and each content streaming apparatus and conducting steering logic calculations; whereby said steering logic calculations are compared against predetermined thresholds, and whereby said gateway steering controller provides an instruction to steer the client device to one of the content streaming apparatus based on a difference between the steering logic calculations and the predetermined thresholds.

4. BRIEF DESCRIPTION OF THE DRAWINGS

The invention will be more fully understood and further advantages will become apparent when reference is had to the following detailed description of the preferred embodiments of the invention and the accompanying drawing, in which:

FIG. 6b illustrates a continued schematic of the aspect of the invention utilizing Band Steering Logic in Each AP of FIG. 6a;

5. DETAILED DESCRIPTION OF THE INVENTION

Figure 1:
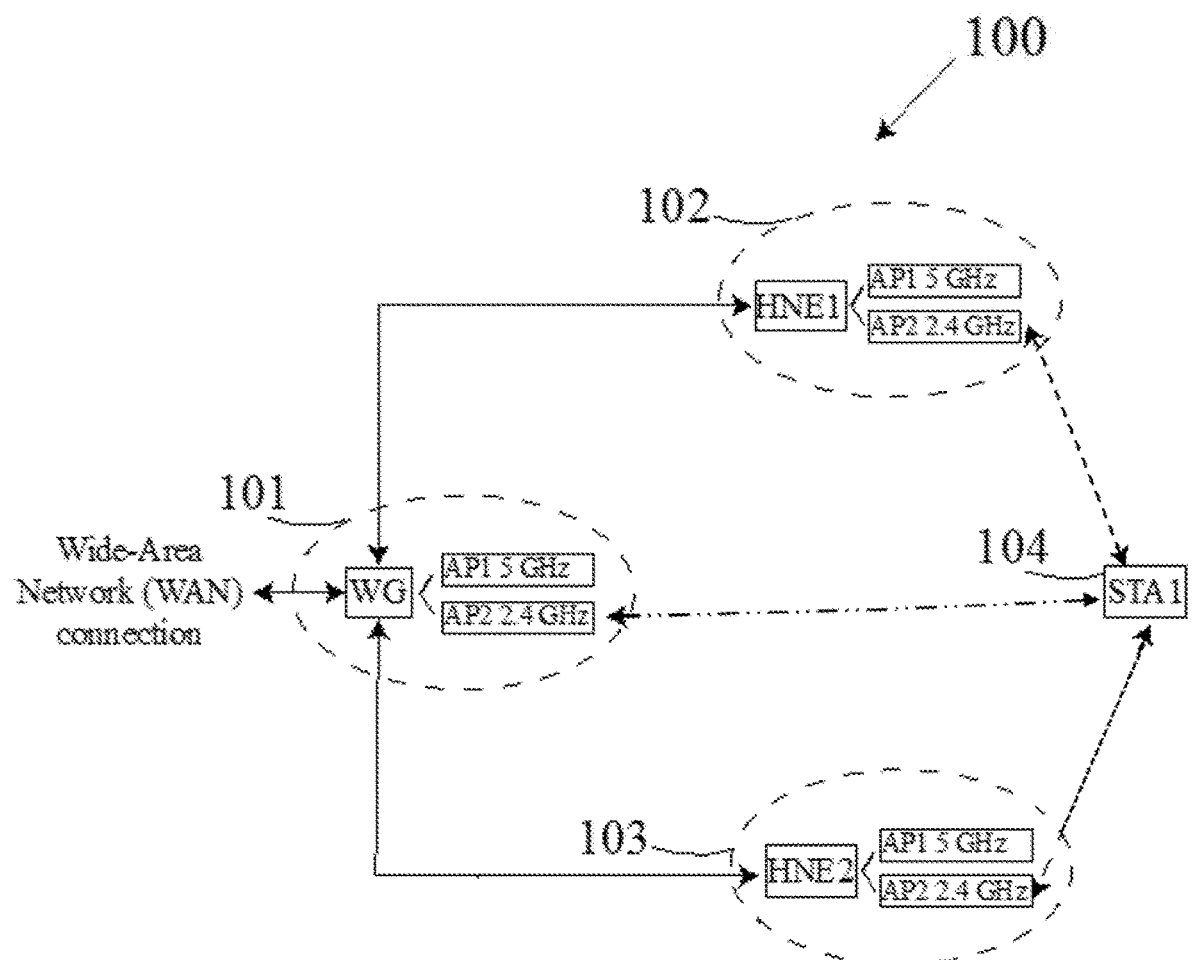
FIG. 1 is a schematic diagram illustrating a residential wireless gateway (GW) with Home Network Extenders (HNE), both having a plurality of access points (APs). A client stations (STA) is shown with different link quality connections to the AP.

This invention relates to a wireless gateway having a gateway steering controller for steering between content streaming apparatuses by executing steering logic determined by signal strength between a client device and a given content streaming apparatus. Content streaming apparatuses include gateway access points (GW APs), extender access points (APs) and other wireless content streaming apparatuses. Client device herein refers to a device communicating via the 802.11 protocol (Wi-Fi) wireless network including, without limitation, a computer, laptop or smartphone. Generally, the wireless gateway is a wireless gateway access point (GW or GW AP) configured with the gateway controller capable of determining signal strength of streaming sessions on all of the gateway devices. Using this information, the gateway controller is configured to conduct steering logic calculations and comparing the calculations against predetermined thresholds.

The gateway device disclosed herein is a GW AP that is configured as, and can be designated as, a streaming manager or gateway steering controller, within a network. The gateway steering controller is configured to instruct associated STA's or extender APs to initiate client steering controls that determine signal strength of each AP with each client device or STA. Using this information, the gateway steering controller performs steering logic and transfers streaming sessions from one AP to another. The gateway steering controller can be implemented by a Gateway Streaming Manager (GSM) in one of plural content streaming apparatuses in the wireless network. Those of skill in the art will appreciate that any suitable wireless transmission protocol may be used, such as WiFi (IEEE 802.11), Bluetooth, 3GPP and 4G LTE, in the wireless network.

A content streaming apparatus as discussed herein includes an input for receiving an input signal, a wireless controller configured to communicate via wireless with a client device and receive from the client device a streaming session request for streaming of requested content, and a plurality of tuners, each of which is configured to selectively tune to a portion of the input signal. The content streaming apparatus also includes a tuner controller configured to select an unused one of the tuners, and tune the selected tuner to receive the requested content from the input signal, and a controller configured to establish a streaming session with the client device via the wireless controller and send the requested content to the client device in the streaming session. The content streaming apparatus also include network connection circuitry, such as an Ethernet controller and Ethernet PHY, and/or a MoCA controller and MoCA PHY.

The content streaming apparatus includes a gateway steering controller configured to: determine whether a client device should be steered to a content streaming apparatus based on at least one sample measurement on received signal strength between the client device and the content streaming apparatus and at least one other content streaming apparatus. The gateway steering controller conducts steering logic calculations. The steering logic calculations are compared against predetermined thresholds. The gateway steering controller provides an instruction to steer the client device to one of the content streaming apparatus based on a difference between the steering logic calculations and the predetermined thresholds.

Content streaming apparatuses may include access points (APs), network extenders containing access points (AP), repeaters, and other contemplated content streaming apparatus having wireless capabilities. Wi-Fi performance of client stations (STAs) connected to an AP are monitored by gateway firmware through a received signal strength indicator (RSSI) of current STA to AP association. Clients having a poor (low RSSI) AP or STA association are steered to a different AP that has adequate throughput capacity, thereby improving wireless connectivity performance.

This invention relates to a wireless gateway (GW) preferably in a residential environment that is capable of communicating with a plurality of content streaming apparatuses, including access points (AP). Each AP preferably includes dual frequencies, 2.4 and 5 GHz. Signal strength of all communicable devices (client devices) are communicated by each AP to the GW. While the subject invention is discussed in relevance to residential environments, it is noted that it has applications in commercial environments as well.

A gateway wireless access point (GW or GW AP) connected to at least on content streaming apparatus, such as wireless APs (in the GW and in HNEs), is configured with a GW controller. The APs communicate signal strengths of all communicable devices, or client devices, linked or associated with the GW. Initially an STA communicates with a plurality of content streaming apparatuses or APs, selects an AP with a good signaling connection (relatively low negative dBm value) and establishes communication with the selected AP.

A common Service Set Identifier (SSID) and passphrase (associated phrase-shifting key (PSK)) are used in the GW's internal APs and HNE's APs for STA association. Once associated with its initially chosen AP, the client STA typically stays connected to the AP during internet or Web communications, unless it is steered to a different AP by the GW controller. All APs transmit STA RSSI data as available to the GW. The GW controller looks for STA low RSSI levels to determine when to steer a STA, addressing the "sticky client" problem. Additionally, a number of client's STA may connect to the same AP thereby overloading the communication capability of an access point. This issue can be addressed by steering for channel utilization or via band steering. GW logic of the subject invention further avoids steering an STA with poor signal quality (low RSSI) to an AP with high channel utilization to avoid channel overloading that AP when addressing the "sticky client" issue.

The APs have the capability to measure the signal strength of received STA data. RSSI is a term used to measure the relative quality of a received signal from a client device, but has no absolute value. The IEEE 802.11 standard specifies that RSSI can be on a scale of 0 to 255 and that generally manufacturers can define their own "RSSI Max" value. IEEE 802-11-2012, IEEE Standard for Information Technology, Telecommunications And Information Exchange Between Systems, Local And Metropolitan Area Network, Specific Requirements and Part 11: Wireless LAN Medium Access Control, (MAC) and Physical Layer (PHY) Specifications. Cisco, for example, uses a 0-100 scale, while Atheros uses 0-60. It's left for determination by the manufacturer (which is why RSSI is a relative index), but it is typically inferred that the higher the RSSI value, the better the signal.

Since RSSI varies greatly between manufacturers, software (such as that sold in association with the trade name MetaGeek) generally uses a more standardized, absolute measure of signal strength: received signal power, measured in decibels (dBm) on a logarithmic scale. The closer to 0 dBm, the better the signal. The units of dBm and RSSI are different measurement units that both represent the same thing, signal strength. The difference is that the RSSI numeric value is a relative index, while dBm is an absolute number representing power levels in dBmW (milliwatts).

When a STA's associated RSSI link to a particular AP is lower than a configurable value (e.g. —75 dBm) or threshold, the GW controller will target that STA to be steered. To support which AP to steer a client to a network's link metric Table is used (for example, see network's link metric Table I shown below).

| Network's Link Metric Table I: AP steering logic | | | | |
|---|---|---|---|---|
| | Measurement | Link Metric | | |
| Band | Status | GW | HNE1 | HNE2 |
| AP1 with 5 GHz | Estimated RSSI (Missing measurement) | −78 dBm | −60 dBm | −66 dBm |
| AP2 with 2.4 GHz | Measured RSSI | −73 dBm | −65 dBm | −61 dBm |

The network's link metric Table I indicates the link RSSI quality of a STA relative to the network APs where the APs are operating on 2.4 or 5 GHz bands. A STA will have an association with only one AP in the network (could be in the GW or in an HNE). RSSI for the STA from non-associated AP(s) in the same band may also be available. STA typically only operate in one band at a time, so RSSI from the STA to an AP in the other band will not typically be available. Consequently, the Link metrics table includes an estimation of the STA's RSSI to APs in the other band when this information is not available.

When STA RSSI measurement is not available in the other band Link Metric=measured RSSI from the other band in dBm+Band Weighting. This applies to the AP in the other band for a given device (GW, HNE1, HNE2, etc.) since the link metric can only be estimated relative the measured band in a given device. The Band Weighting is a configurable estimate. In the example it is assumed a Band Weighting of +5 dBm is needed to estimate RSSI for 2.4 GHz links if STA link measurements are available at 5 GHz but not 2.4 GHz. A positive weighting to 2.4 GHz is used in the example since 5 GHz signal strength is typically lower than that of 2.4 GHz. The opposite would apply if the STA information were available at 2.4 GHz but missing at 5 GHz. The gateway controller uses the network link metric table to determine which AP to steer a target STA to. It does this by eliminating those AP with measured and estimated links with RSSI below an acceptable quality threshold (e.g. −65 dBm) to the target STA. The RSSI link threshold is a configurable setting. Using the example values in Table I and example threshold of −65 dBm, only HNE1 AP1, HNE1 AP2 and, HNE2 AP2 are remaining AP candidates for steering the target STA to An AP Band+Option Table II is included as an option to the AP steering logic presented in Table I to further refine AP steering decisions. In the AP_Band+Option Table II AP steering logic uses channel utilization measurements to avoid steering a STA into an overly utilized AP, when it can be avoided.

| Network's Link Metric Table II: AP steering logic | | | |
|---|---|---|---|
| | Measured Utilization | | |
| Band | GW | HNE1 | HNE2 |
| AP1 with 5 GHz | 55% | 68% | 89% |
| AP2 with 2.4 GHz | 73% | 82% | 59% |

When the band utilization for a particular AP is greater than an acceptable value (e.g. 75%), the gateway controller will eliminate that AP as a candidate for AP steering of the STA. The channel utilization threshold is a configurable setting. Using the example above in the table and example threshold 75%, HNE2 AP1 is eliminated as an AP candidate for steering the target STA to.

When a non-associated AP is detected, its RSSI is not readily available and has to be estimated in a Link-metrics table. The RSSI estimation process includes measured RSSI from other band+Band Weighing (described previously). The wireless gateway controller performs the operation of steering the connected sticky STA (target STA) connected to its current AP to another AP with good link quality (adequately low RSSI) and which is not overloaded (adequately low channel utilization).

When the residence is large and HNE AP are required, HNE AP extenders may be connected to the GW by wired connection or wireless connection. Wired extenders use G.hn, MoCA or other dedicated network path(s) with the GW. The wireless connection between STA and the AP extenders is similar to that detailed earlier.

In its preferred embodiment, the residential wireless AP steering solution comprises a residential wireless network comprised of a wireless gateway (GW) controller capable of communicating with a plurality of wireless access points, APs (in the GW and in HNEs) each having chipsets for communication with wireless client devices (STAs). The HNE with wired or wireless links to the RG. Each of the APs having a chipset for communication with said STA at frequencies of 2.4 GHz or 5 GHz. A client station STA having a modem with a chip set operating at 2.4 GHz or 5 GHz or both (although typically not concurrently), initially selecting the AP with high signal value or low dBm negative value. A common Service Set Identifier (SSID) and passphrase (associated PSK) are used in the GW's internal APs and HNE's APs to simply STA association. All the associated APs communicating to the wireless gateway controller report received STA signal strength indication value, RSSI, a high negative value of RSSI of below a configurable value (e.g. −75 dBm) being indicative of a weak connection, whereupon the STA has to be steered to another AP.

The gateway controller recognizing low signal strength of a STA, and steering this target STA from its currently associated AP to another AP with better link quality (RSSI value). The use of the target STA's RSSI link quality measurements at one band for estimating missing RSSI link quality on another band (to create a complete AP link metric table for the target STA). Applying a configurable positive weighting factor offset when estimating the target STA's 2.4 GHz RSSI link quality from 5 GHz link measurements. Applying a configurable negative weighting factor offset when estimating the target STA's 5 GHz RSSI link quality from 2.4 GHz RSSI link measurements. With the gateway controller using the AP link metric table to determine which AP to steer a target STA to, by eliminating those AP with measured and estimated links with RSSI below a configurable, acceptable quality threshold (e.g. −65 dBm) to the target STA. Additionally with the use of AP channel utilization to avoid steering a STA into overly utilized AP when it can be avoided. With the gateway controller using the AP channel utilization table to further which AP to steer the target STA to, by further eliminating AP with channel utilization over a configurable, acceptable value (e.g. 75%), the gateway controller steers the target STA to one of the AP it found acceptable after RSSI link quality and channel utilization screening, by blacklisting the client on those AP not found to acceptable (including its current associated AP) and disassociating it from its current associated AP.

A client station STA communicates with a plurality of communicable AP to obtain their received signal strength indication (RSSI) in dBm units, selecting an AP with lowest negative dBm value or highest signal strength to establish communication with the selected AP. The client provides a Service Set Identifier (SSID) and passphrase (associated PSK) to authenticate connection to the wireless gateway. Once connected, the client STA stays connected to the access point which further connects to the wireless gateway GW during internet or Web communications unless the STA is steered to a different AP by the wireless gateway system monitor. That is to say, each client at a station (STA) connects to a single AP providing Service Set Identifier (SSID) and passphrase (associated PSK) to authenticate connection to the wireless gateway. When the AP that the client is connected to becomes overloaded, the Wi-Fi connectivity becomes very slow and is known in the industry "sticky client" problem.

Specifically, the selected AP transmits to the wireless gateway the RSSI data of all communicable access points for the client station STA. The AP provided RSSI list is also available to the wireless gateway, which corroborates the STA provided RSSI with that provided by the AP. The client STA also has a chip set for communication at 2.4 GHz, 5 GHz or chips for both frequencies. If a client STA has only a 2.4 GHz chip set, it can only communicate at 2.4 GHz with the connected AP and cannot be band steered to an AP for communication at 5 GHz. A number of client's STA may connect to the same access point AP that is used by the client, thereby overloading the communication capability of the access point. This progressively reduces the communication rate, creates a "sticky client" problem. The wireless gateway controller managing the AP steering and band steering requires scanning of all APs and STAs.

The objective of the invention is to prevent a "sticky client" problem by the steering the AP connection to the client station STA seamlessly to a better connectivity to a less loaded AP or steer the communication band to a higher frequency such s 5 GHz so that data can flow at a higher rate. In this embodiment, this band steering is managed by the wireless gateway controller.

The GW controller utilizes information gathered from all APs (wireless extender APs, wired extender APs, repeaters and/or the GW's own AP) including: associated STA RSSI measurements, associated STA traffic level measurements, non-associated STA RSSI measurements (if available via Wi-Fi chipset API in APs), band of operation for prior STA information, AP channel utilization measurements (if needed per configuration setting), information retained by the controller for all STA it has attempted to AP steer (successful or unsuccessful), STA last AP steering time, STA last AP that it was steered to and STA steering stats (should include prior data but beyond this are not needed for steering decisions).

The Controller configuration settings for AP steering include feature selection (enable or disable), threshold settings, band weighting values, APs capability for providing non-associated STA RSSI (yes or no), choice for AP steering if prior capability is not provided (yes or no) and choice for using channel utilization restrictions in AP steering (yes or no).

The APs need for band steering includes information an AP must collect from its wireless interfaces (in both bands), AP channel utilization measurement, Associated STA RSSI measurement, Associated STA Wi-Fi capability (i.e. HT, VHT), Associated STA traffic level measurement, Band of operation for prior STA information, Information an AP must retained for all STA it has attempted to band steer (successful or unsuccessful), STA last band steering time, STA last band/interface that it was steered to (parameter that may prove useful), STA steering stats should include prior data but beyond this are not needed for steering decisions, AP configuration settings for band steering, Feature selection (enable or disable) and Feature Threshold settings.

The residential wireless gateway steering system may comprise a wireless gateway (GW) with a plurality of connected points (AP), each connecting to one or more client stations STA and each STA having a chip set communicating at 2.4 GHz or 5 GHz or both frequencies with all neighborhood APs to acquire their received strength indication RSSI and create an ordered list from the lowest RSSI. This ordered list is used to initiate a BSS transition management frame request according to an IEEE 802.11v specification and verifying whether the STA is connected to an AP other band interface and band steering the STA to a different band of 5 GHz from 2.4 GHz, whereby faster BSS transition is accomplished without the help of a wireless gateway monitor and without actively scanning RSSI values of all APs and STAs.

In the subject system and method AP steering is provided to move a client (STA) "stuck" with a bad connection (low RSSI) on one AP in a residence to another AP with better connection in the residence. Note that air-time fairness logic provided by chipset vendors mitigates one client "hogging" airtime from others but this client is better off being moved. Band steering is also provided to optimize channel utilization in a given AP to avoid overloading one band over other band. Dynamic ("smart") channel selection may be employed from chipset vendor in coexistence with the band steering.

A residential network is comprised of a wireless gateway (GW) and associated wireless extenders. Wireless extenders use G.hn, MoCA or other dedicated network path(s) with the gateway AP. As such they can have different AP Wi-Fi channel(s) for their stations (STA), to maximize Wi-Fi network utilization. Residential networks may also have wireless repeaters that use one Wi-Fi radio per band to communicate with STA and with AP. As such they and the GW AP require a shared Wi-Fi channel and associated channel change coordination with the GW AP. Outside of channel coordination, wireless repeaters have the same steering consideration as wireless extenders.

The GW AP and wireless extender APs in a residence share the same SSID and WPA2 passphrase (PSK). WPA2 Enterprise is preferably not utilized, avoiding use of 802.1x protocol with an authentication server. As such Fast BSS transition (802.11r) which conducts Preauthentication (section 11.5.9.2 of IEEE 802.11 2012 standard) using 802.1x for PMK SA distribution to APs is not supported. However, this support is an option if needed. WPA-Personal may be utilized in which PMK SA is cached (section 11.5.9.3 of IEEE 802.11 2012 standard) after initial STA association with an AP. This approach has been found simpler than Fast BSS but has the downside of imposing delay of deriving PMK at initial authentication/association with each AP. However once a STA associates with a given AP, it will experience the same short delay result as for Fast BSS with 4-way handshake using PMK to establish PTK.

The GW AP contains an AP steering controller and wireless extenders contain an AP steering client. Having a controller in GW simplifies network architecture. Naturally control could be distributed for greater robustness if needed. Note band steering need not utilize a central GW controller. Instead each AP (GW and wireless extenders) can have their own band steering logic. Steering logic requires averaging several sample measurements (in configurable sliding window). Averaging is needed to provide a more reliable measurement and prevent spurious activations. Preferably, steering logic commences following the establishment of a security communications link between the GW and wireless extenders. The GW may establish secure connections with wireless extenders via IEEE1905.1a secure setup (e.g. for G.hn or MoCA link). Software Home Network Controller (HNC) logic may be used for app layer discovery, configuration, stats collection, and steering control.

GWAP and wireless extender APs in a residence share the same SSID and WPA2 passphrase (PSK). WPA-Personal is utilized preferably utilized. Clients (STA) support single or dual band Wi-Fi. Wireless STBs are typically 5 GHz single band. Mobile devices are typically dual band with 2.4 GHz and 5 GHz, with non concurrent radio operation. The GW and wireless extender APs are preferably dual band with 2.4 GHz and 5 GHz, with concurrent radio operation. Multiple 5 GHz radios are a special case which is not addressed in the band-steering, but could if needed. Tuning for AP and band steering thresholds will be necessary and include default parameters as useful placeholders.

FIG. 1 illustrates at 100 the details of the residential wireless gateway network. The wide area network connects to the gateway WG 101 that has two associated access points AP1 and AP2 operating at 5 GHz and 2.4 GHz. WG 101 is wirelessly connected to gateway (GW) HNE1 102 that has two associated access points AP1 5 GHz and AP2 2.4 GHz. Additionally, WG 101 is connected to gateway (GW) HNE2 103 through wired GW/HNE link, such as Ethernet, G.hn-PLC, and/or MoCA WiFi, that has two associated access points AP1 5 GHz and AP2 2.4 GHz. STA1 shown at 104 is currently associated with AP2 of WG 101. If the signal strength or integrity between AP2 of WG 101 is poor steering action is triggered. Poor signal strength may be set or determined by threshold parameters. Signal strength is determined as between STA1 104 and each of HNE1 102, HNE2 103 and WG 101. HNE1 102 and HNE2 103 provide alternate links with non-associated link quality measurement. For example, wherein the connection between AP2 of GW 101 and the STA1 104 is poor, STA1 104 terminates streaming with AP2 of GW 101 and is connected to HNE1 102 AP2, which is the same operating frequency of 2.4 GHz. Alternatively the STA1 104 can be connected to HNE2 103 AP2 operating at 2.4 GHz. Both HNE1 102 and HNE2 103 are non-associated links to the gateway GW.

Figure 2:
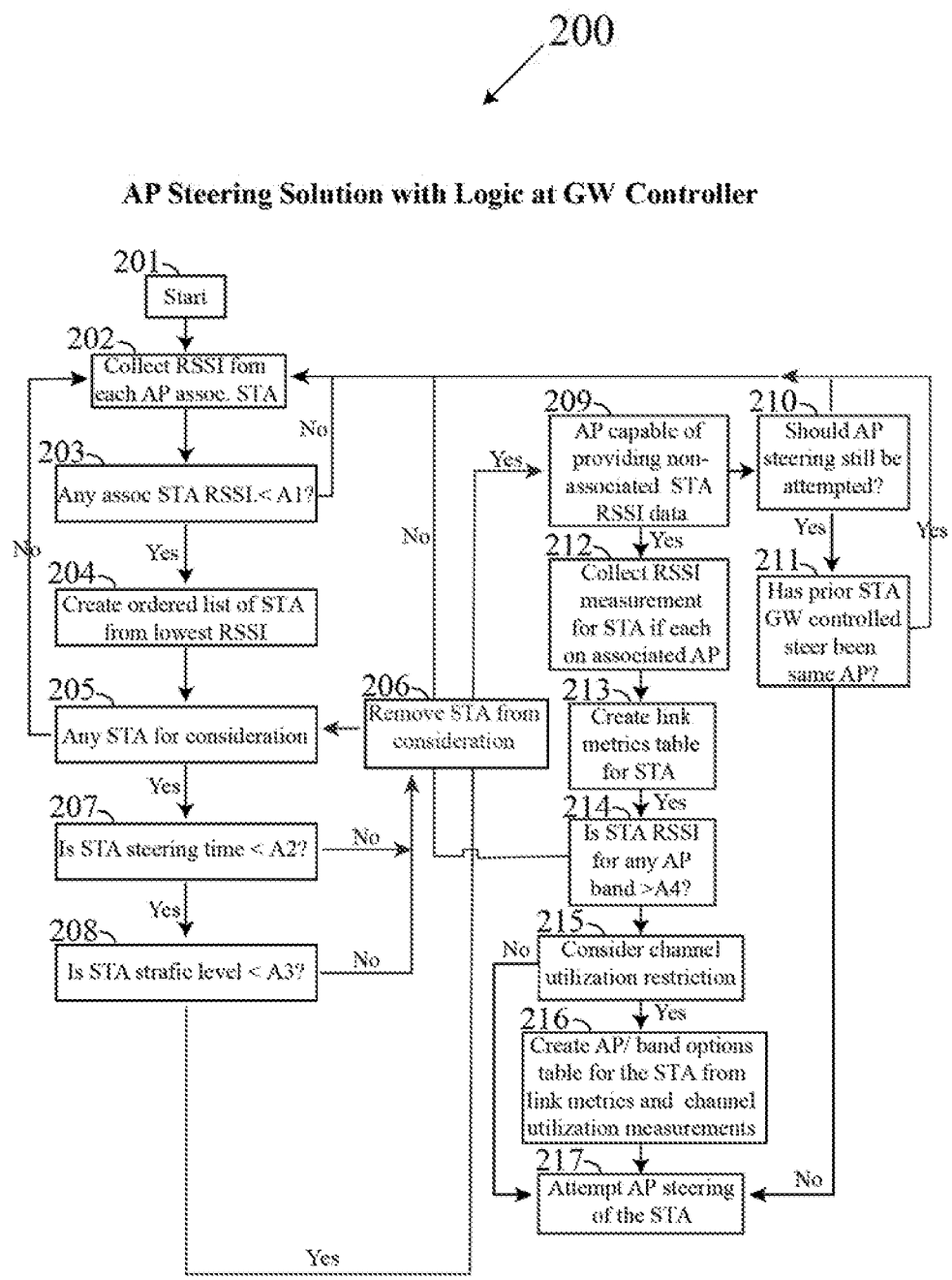
FIG. 2 illustrates the sequence of steps involved when AP steering of a client STA from one over loaded AP to a less loaded AP.

FIG. 2 illustrates the sequence of steps involved in AP steering of a client STA from one overloaded AP to a less loaded AP paying attention to traffic loading considerations, shown generally at 200. The system controller starts at step 201. At step 202, the wireless gateway (GW) collects RSSI data from each AP and each STA associated with the GW. At step 203, the GW verifies if any associated STA has RSSI values<A1. In this figure, A1 is the RSSI threshold below which AP steering from an existing AP connection should be considered. A1 value is configurable, with default placeholder of −75 dBm. If yes, at step 204, the wireless gateway GW creates an ordered list of STA starting from the lowest RSSI. At step 205, the wireless gateway compares the RSSI values and determines if any other AP has a better signal compared to the AP current connected to the STA. If this is yes, at step 207, the wireless gateway checks to see if the STA steering time is greater than A2. A2 is the minimum allowed delay since last the steering occurrence. It is configurable, with a default placeholder of 30 s. If it is not, it removes the STA from consideration at step 206 and is directed to step 205. Next it verifies if the STA steering time is less than A2 (step 207) and the STA traffic level is less than A3 (step 208). A3 is the traffic throughput below which steering is allowed. It is configurable, with a default placeholder of 100 Kbps. If it is not, it removes the STA from consideration at step 206 and is directed to step 205.

Next at step 209, the AP capable of providing non-associated STA RSSI data is detected. At step 212, the RSSI measurement of each non-associated AP for STA is collected. A link metrics table for the STA is created at step 213 by the wireless gateway system. Additionally a channel utilization measurement is checked at step 215. AP steering to another AP for the STA is attempted at step 217. Idle time is another consideration but may be harder to estimate given that background management traffic always exists. A4 is the RSSI threshold above which AP steering to a new AP should be considered. It is configurable, with a default of −50 dBm. A5 is the maximum period allowed for steering occurrence. It is configurable, with a default of 5 s.

Figure 3:
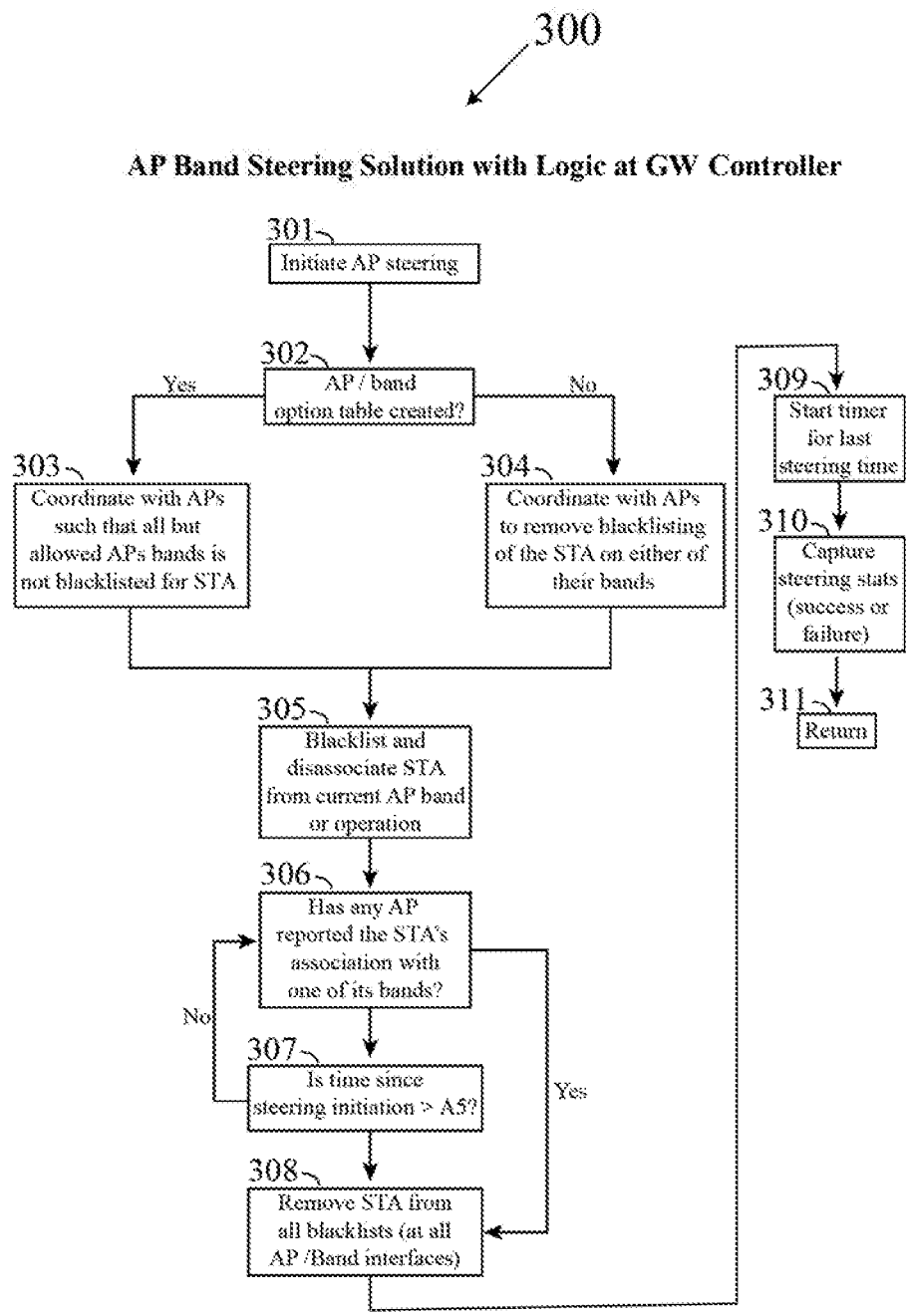
FIG. 3 illustrates the sequence of steps involved in AP and band steering of a client STA from one over loaded AP to a less loaded AP with a different band.

FIG. 3 illustrates at 300 an AP band steering solution using logic at the GW controller. The sequence of steps involved in band steering a client STA from one over loaded access point AP to a less loaded AP with a different band. At step 301, the AP band steering is initiated. At step 302, the system controller checks to see whether the AP band options table is created. At step 303 GW coordinate with all APs that are not blacklisted for the STA. At step 304, when no band option is created the GW coordinates with all APs to remove blacklisting of the current STA on either of the bands. At step 305, the controller of GW blacklists and disassociates the current AP with the STA. At 306, it detects if any of the APs has reported association of STA with one of the bands. At 307 the GW checks if time since steering initiation is greater than A5. If it is true, remove and blacklist the STA at all AP band interfaces. At 309, the GW then starts the last steering timer and captures steering stats at step 310. This blacklisting allows band steering to occur without a large amount of search between various access points.

Figure 4:
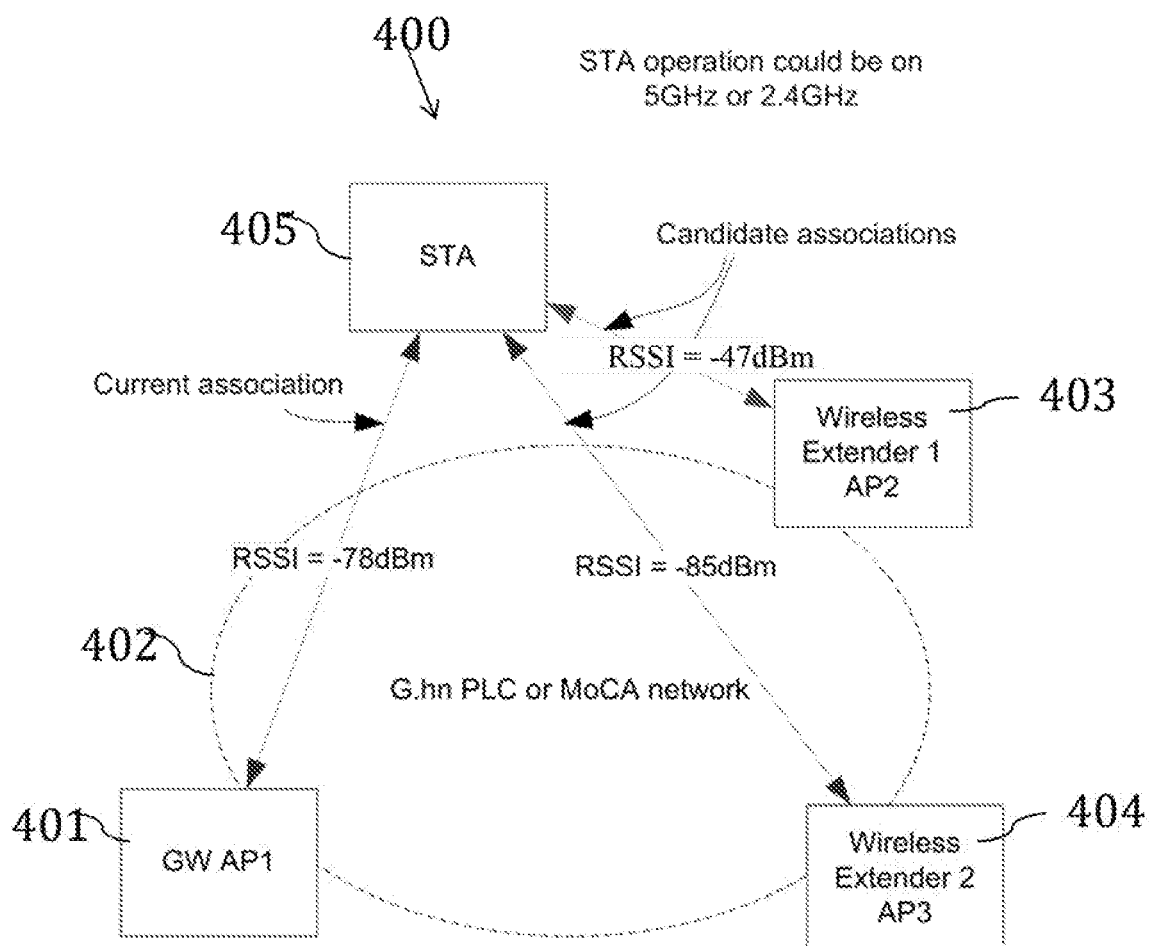
FIG. 4 is a schematic diagram illustrating an STA communicating with adjacent APs to determine their RSSI and assess their suitability for AP steering or band steering, or both.

FIG. 4 is a schematic diagram at 400 illustrating an STA 405 communicating with adjacent APs to determine their RSSI and assess their suitability for AP steering or band steering. The STA at 405 is currently associated with GW AP1 at 401 with an RSSI of −78 dBm. This is a weak signal, which may lead to failed communication between STA 405 and GW AP1 401. One candidate available is located at 403, WLAN Extender 1 AP2, which has an RSSI of −47 dBm. This communication will have better and more reliable communication. The other alternative is located at 404, WLAN Extender 2 AP3 with an RSSI of −85 dBm, which is not as good as AP between WLAN Extender 1 AP2 403 and STA 405. This potential information of RSSI values available at adjacent APs is communicated to the GW 402 which manages the AP steering.

Figure 5:
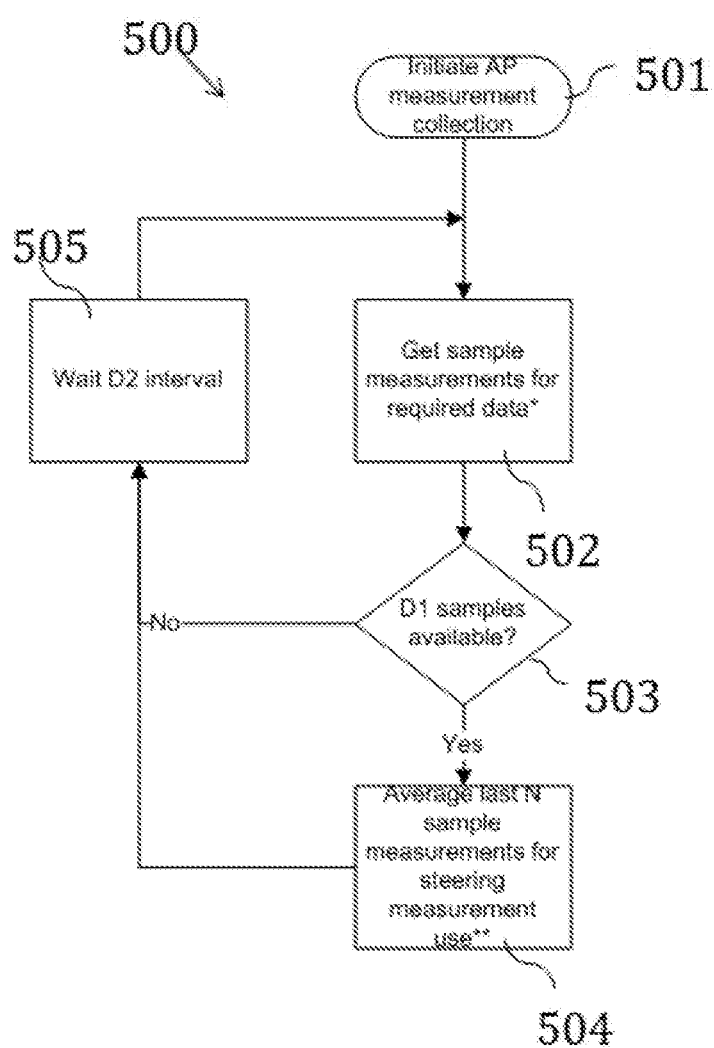
FIG. 5 is a schematic diagram illustrating data measurements for AP and band steering collected at each AP.

FIG. 5 is a schematic diagram illustrating data measurements for AP and band steering collected at each AP, shown generally at 500. At 501 AP measurement collection is initiated. At 502 sample measurements for required data are collected. Required data measurements include the following for each WiFi band/interface: RSSI and traffic (TX+Rx throughout) level for associated and non-associated STA; RSSI for non-associated STA (when available via AP1. Bandwidth utilization of the interface may be implemented.

Required data measurements include following for each Wi-Fi band/interface: (i) RSSI and traffic (Tx+Rx throughput) level for associated and non-associated STA; (ii) RSSI for non-associated STA (when available via AP1 in wireless chipset); (iii) Bandwidth utilization of the interface. At 503 query as to if D1 samples are available? D1 is the number of sample measurements needed to form an average measurement used for AP and band steering operations. Configurable with default of 3. If yes, at 504 the average last N sample measurements for steering measurement use are determined.

Sample measurements are averaged over a configurable sliding window (moving average) and made available for AP steering (for GW controller) and band steering (for local AP steering logic). The moving average is needed to provide a more reliable measurement and prevent spurious activations. D2 is interval between sample measurements. Configurable with 5 s. If at 503 the answer is no, at 505 wait D2 interval is carried out, and steps 502-503 are repeated. Averaged measurements should be conducted in a linear manner. So in case of RSSI, dB sample measurements should be converted to linear samples for averaging, followed by conversion back to dB for the average value.

Radio Resource Management (RRM) 802.11k includes Neighbor Reports. A STA with this support can send a neighbor report request to an AP. In turn, the AP with this support returns a neighbor report to the STA. Neighbor reports contain information about known neighbor APs that are candidates for a service set transition via NeighborListSet. NeighborListSet includes information from dot11RRMNeighborReportTable (MIB in spec) concerning neighbor APs. The request/report pair enables a STA to gain information about the neighbors of the associated AP to be used as potential roaming candidates. As such it could be used by STA to address the "sticky client" problem on their own rather than having to go through the AP and GW.

Figure 6A:
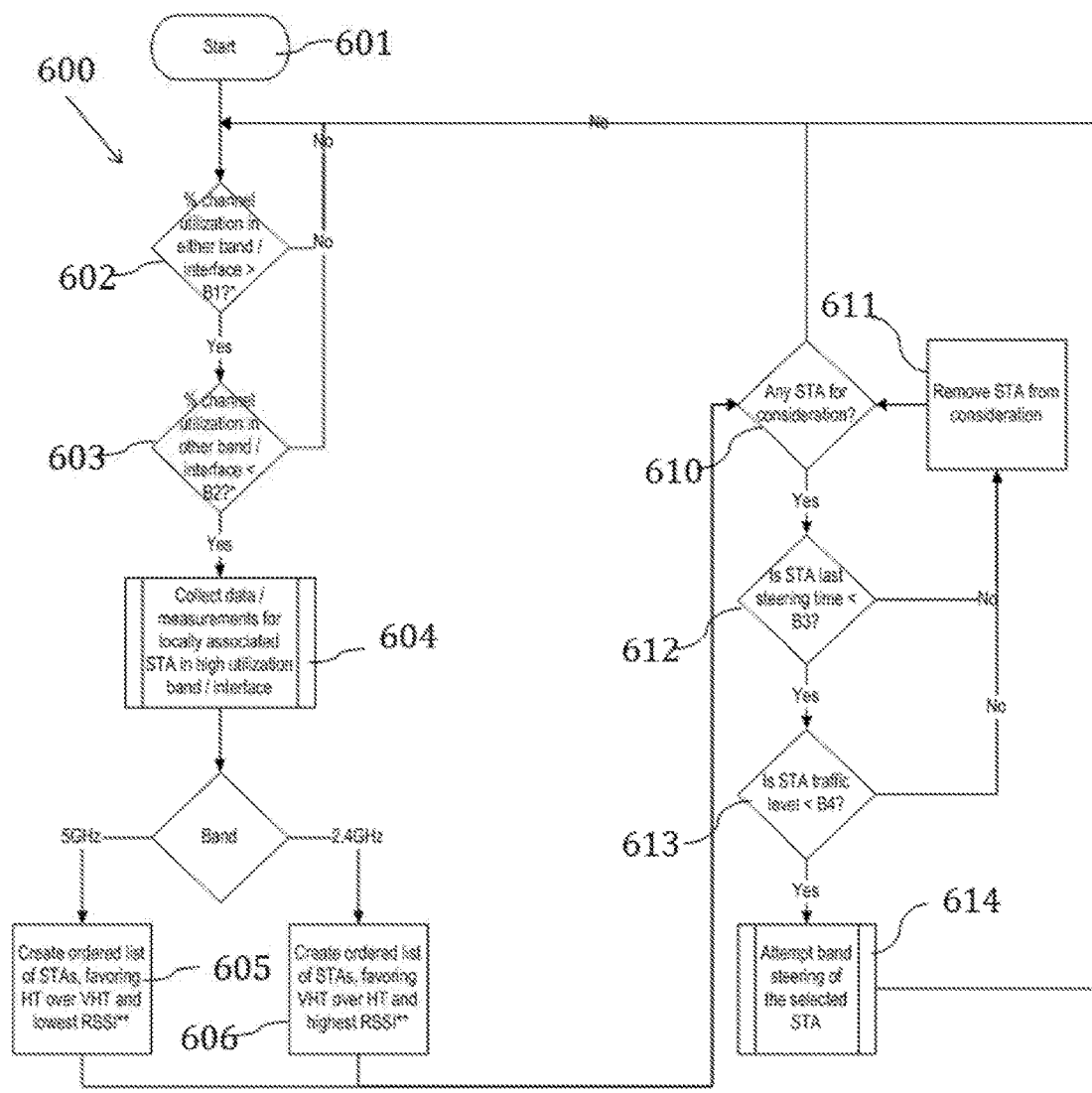
FIG. 6a illustrates a schematic of an aspect of the invention utilizing Band Steering Logic in Each AP.

FIG. 6a illustrates a schematic of an aspect of the invention utilizing Band Steering Logic in Each AP, shown generally at 600. At 601 band steering logic application starts. At 602 query % channel utilization in either band/interface>B1? Utilization refers to free airtime. B1 is the % channel utilization threshold above which Band steering from this band interface to the other band interface should be considered. Configurable with default of 80%. If No, go to 610. If yes, the % channel utilization in other band/interface<B2? Is queried at 603. B2 is the % channel utilization threshold below which Band steering to this band interface is allowed. Configurable with default of 50%. If No, go to 610. If yes, at 604 data/measurements are collected for locally associated STA in high utilization band/interface. At 605 and 606 an ordered list of STAs favoring HT over VHT and lowest RSSI for 5 GHz and 2.4 GHz are created, respectively. STAs which are determined to have only single band support are removed (based on probe data or excessive, prior steering failures).

At 610, query of any STA for consideration? If No, remove STA from consideration at 611. If yes, at 612 query is STA last steering time<B3? B3 is minimum allowed delay since last steering occurrence. Configurable, with default placeholder of 30 s. If No, remove STA from consideration at 611. If yes, at 613 query is STA traffic level<B4? If No, remove STA from consideration at 611. If yes, attempt band steering of the selected STA at 614. B4 is traffic throughput below which steering is allowed. Configurable, with default placeholder of 100 Kbps. Idle time is another consideration but may be harder to estimate given that background management traffic always exists. B5 is maximum period allowed for steering occurrence. Configurable, with default of 5 s. Percent utilization refers to percent free airtime, including airtime utilization from AP and neighboring AP that share media access to the channel.

Figure 6B:
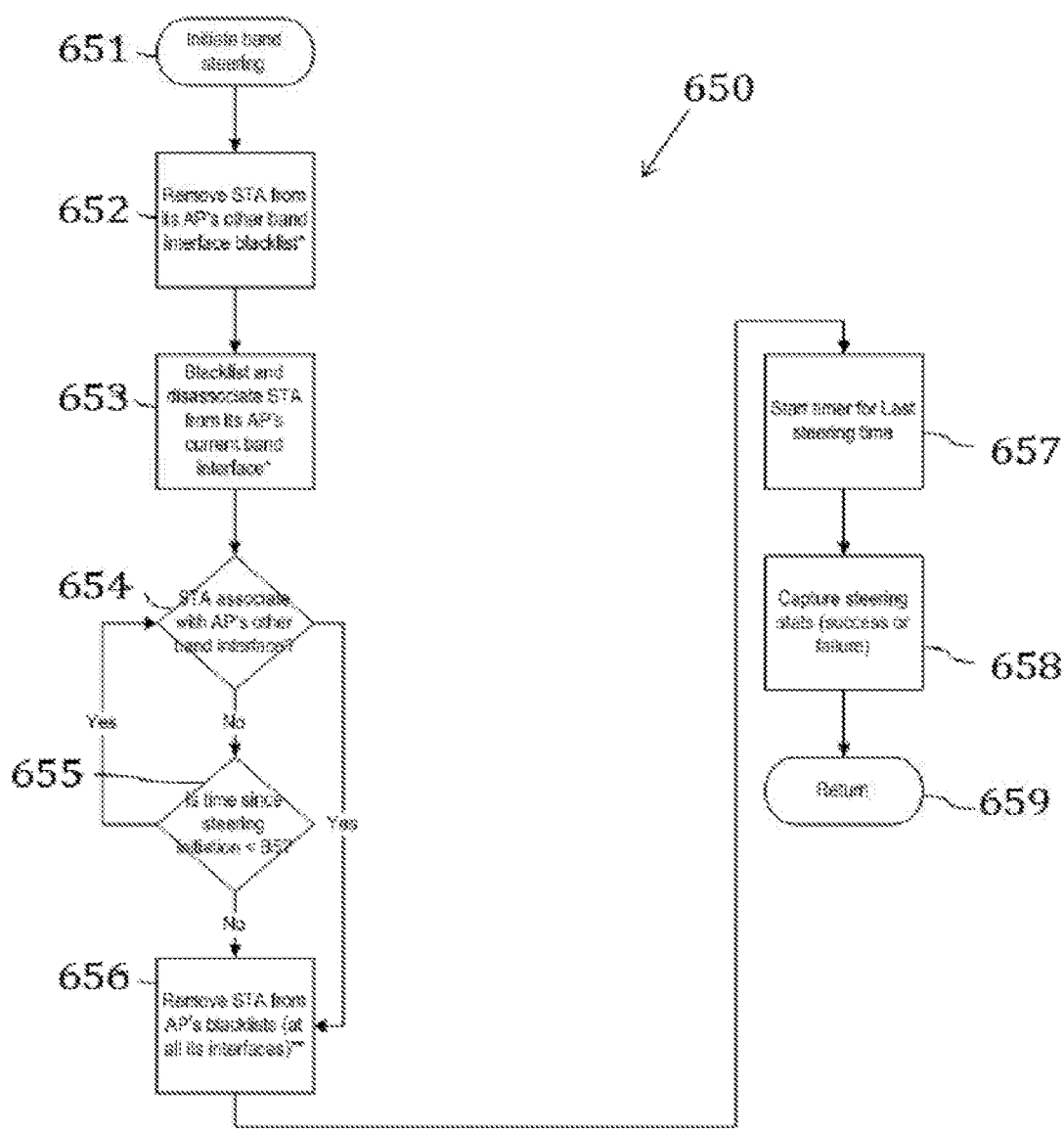

FIG. 6b illustrates a continued schematic of the aspect of the invention utilizing Band Steering Logic in Each AP of FIG. 6a, shown generally at 650. At 651 band steering is initiated. At 652 STA is removed from its AP's other band interface blacklist. Assumption is that the STA will pick the AP's other band to associated with but it could also associate with another AP/band, assuming it is not blacklisted there. At 653 the STA is blacklisted and disassociated from its AP's current band interface. Next, at 654 query STA associate with AP's other band interface? If yes, go to remove STA from AP's blacklist (at all its interfaces) at 654. If No, go to 655 and query: Is time since steering initiation<B5? If yes, go back to step 654; if No, at 656 the STA is removed from AP's blacklists. The full blacklist removal is intended to allow a STA unrestricted band/interface steering opportunity should it have the need. At 657 a start time for last steering time is initiated. At 658 capture steering stats is carried out and returned 659.

Summary information the APs need for band steering information an AP must collect from its wireless interfaces (in both bands) includes: (1) AP channel utilization measurement; (2) Associated STA RSSI measurement; (3) Associated STA Wi-Fi capability (i.e. HT, VHT); (4) Associated STA traffic level measurement; and (5) Band of operation for prior STA information. Information an AP must retained for all STA it has attempted to band steer (successful or unsuccessful) includes: (1) STA last band steering time; (2) STA last band/interface that it was steered to (parameter that may prove useful); and (3) STA steering stats should include prior data but beyond this are not needed for steering decisions. AP configuration settings for band steering includes feature selection (enable or disable) and feature threshold settings (addressed previously).

Figure 7:
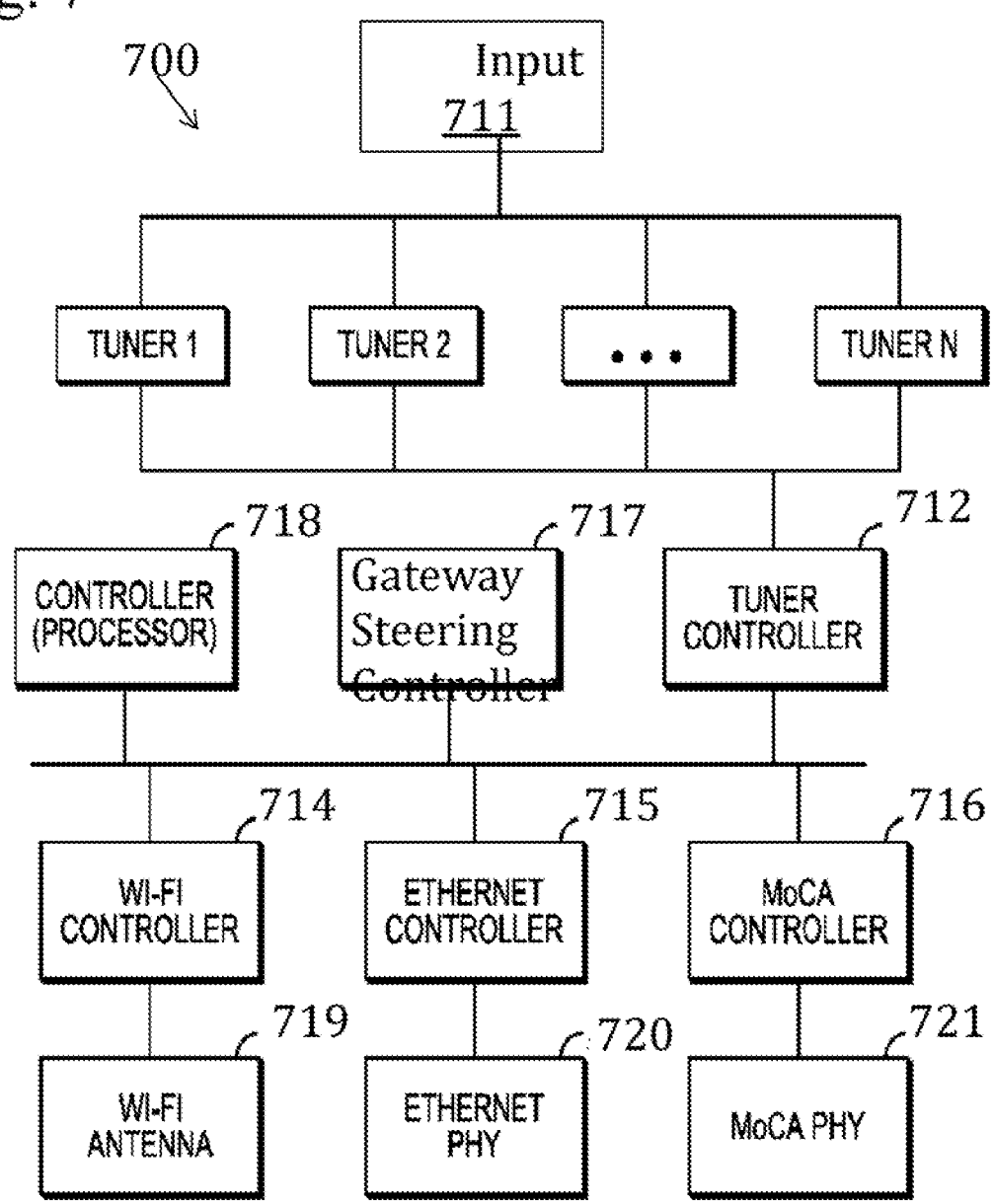
FIG. 7 is a block diagram of a content streaming apparatus, or gateway device.

FIG. 7 shows generally at 700 an example of a gateway device of the present invention. The gateway device is a content streaming apparatus that is a gateway to content, data, and any information accessible through signals on input 711. The input 711 may be an RF input that connects to a content provider, such as a television program provider, by terrestrial antenna, satellite dish, or wired cable. The gateway device includes a plurality of tuners. Tuner 1, Tuner 2, . . . , Tuner N, each of which selectively tunes to a requested frequency or channel of content. A tuner Controller 712 controls each tuner to tune to an instructed frequency or channel. The Tuner Controller 712 also determines whether an unused tuner is available, and if so, reserves a tuner as a destination tuner during a transfer of a streaming session from another gateway device.

The gateway device includes a controller 718, which could be implemented by an integrated circuit or circuits or by a processor, that converts content signals from the tuners to appropriate signals for wireless (e.g. Wifi or LTE) transmission via the wireless controller 714 and wireless antenna 719. The gateway device includes an Ethernet controller 715 and/or a MoCA controller 716 by which the gateway device can be networked with other gateway devices, or any other networking capable device. The Ethernet controller 715 and the MoCA controller 716 interface to the network via the Ethernet PHY (physical transceiver) 720 and MoCa PHY (physical transceiver 721, respectively.

The gateway device also includes a Gateway Steering Controller (GSM) 717, which monitors streaming sessions on all of the gateway devices in the network, and monitors the signal strength of the client devices. The gateway device can be in the form of a so called "set top box", AP, extender AP, etc., or may be built into a television or other media content playing apparatus.

Figure 8:
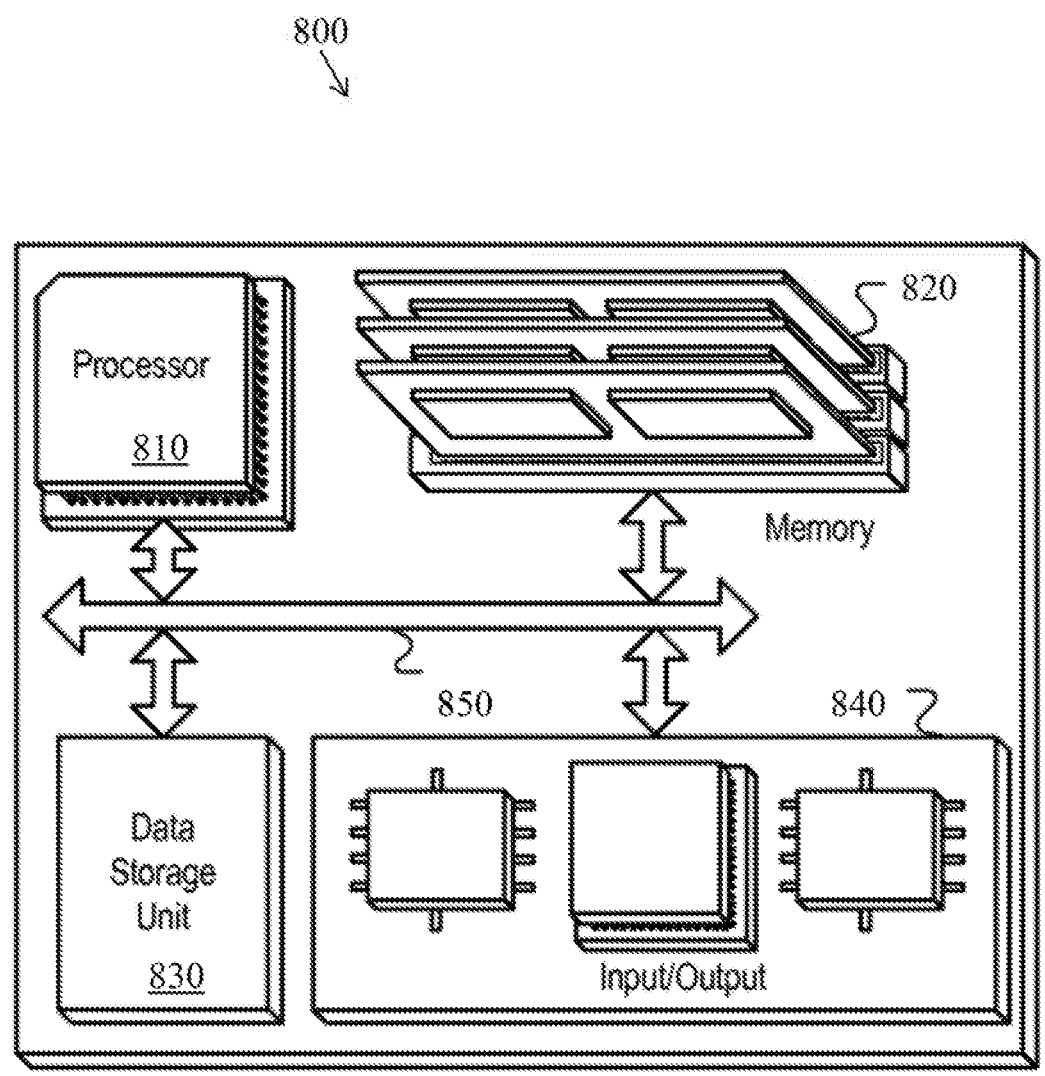
FIG. 8 is a block diagram of a hardware configuration operable to facilitate the subject auto brightness controlled adjustment by the set-top box.

FIG. 8 is a block diagram of a hardware configuration of an AP operable to facilitate the subject auto brightness controlled adjustment by the set-top box, shown generally at 800. The hardware configuration can include a processor 810, a memory 820, a storage device 830, and an input/output device 840. Each of the components 810, 820, 830, and 840 can, for example, be interconnected using a system bus 850. The processor 810 can be capable of processing instructions for execution of the subject method, system and computer readable media within the hardware configuration 800. In one implementation, the processor 810 can be a single-threaded processor. In another implementation, the processor 810 can be a multi-threaded processor. The processor 810 can be capable of processing instructions stored in the memory 820 or on the storage device 830. The memory 820 can store information within the hardware configuration 800. In one implementation, the memory 820 can be a computer-readable medium. In one implementation, the memory 820 can be a volatile memory unit. In another implementation, the memory 820 can be a non-volatile memory unit. In some implementations, the storage device 830 can be capable of providing mass storage for the hardware configuration 800. In one implementation, the storage device 830 can be a computer-readable medium. In various different implementations, the storage device 830 can, for example, include a hard disk device, an optical disk device, flash memory or some other large capacity storage device.

In other implementations, the storage device 830 can be a device external to the hardware configuration 800. The input/output device 840 provides input/output operations for the hardware configuration 800. In one implementation, the input/output device 840 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device (e.g., access point, cable modem, router, wireless extender, or other access device) or subscriber device (e.g., set-top box/station, etc.). In another implementation, the input/output device can include driver devices configured to send communications to, and receive communications from one or more networks (e.g., WAN, local network, cloud, headend/cloud controller, etc.).

Those skilled in the art will appreciate that the invention improves upon methods and systems for adjusting viewing brightness and luminance of a television screen through set-top box control. The subject matter of this disclosure, and components thereof, can be realized by software instructions that upon execution cause one or more processing devices to carry out the processes and functions described above. Such instructions can, for example, comprise interpreted instructions, such as script instructions, e.g., JavaScript or ECMAScript instructions, or executable code, SoftAp mode pulse timing activation and deactivation instructions, signal strength activation and deactivation software, initial fingerprint (birth certificate) logarithmic and execution instructions, activation signals or software, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

The present invention may be implemented as any combination of a system, a method, an integrated circuit, and a computer program on a non-transitory computer readable recording medium.

The content streaming apparatuses, gateway devices, and/or the GSM may be in the form of an access point, set-top box or other standalone device, or may be incorporated in a television or other content playing apparatus, or other device and the scope of the present invention is not intended to be limited on such forms.

The components of the content streaming apparatuses, gateway devices, and GSM may be implemented as Integrated Circuits (IC), Application-Specific Integrated Circuits (ASIC), or Large Scale Integrated circuits (LSI), system LSI, super LSI, or ultra LSI components which perform a part or all of the functions of the GSM, and gateway devices. Each of the processing units can be many single-function components, or can be one component integrated using the technologies described above. Components may also be implemented as a specifically programmed general purpose processor, CPU, a specialized microprocessor such as Digital Signal Processor that can be directed by program instructions, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

The present invention may be a non-transitory computer-readable recording medium having recorded thereon a program embodying the methods/algorithms discussed above for instructing a processor to perform the methods/algorithms.

Each of the elements of the present invention may be configured by implementing dedicated hardware or a software program controlling a processor to perform the functions of any of the components or combinations thereof. Any of the components may be implemented as a CPU or other processor reading and executing a software program from a recording medium such as a hard disk or a semiconductor memory.

It is also contemplated that the implementation of the components of the present invention can be done with any newly arising technology that may replace any of the above implementation technologies.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A wireless gateway for steering a client device between content streaming apparatuses in a wireless local area network (WLAN), the wireless gateway comprising:
    a gateway steering controller configured to determine whether to steer a client device to a content streaming apparatus based on at least one sample measurement of received signal strength on a first Wi-Fi radio band between the client device and the content streaming apparatus and at least one other content streaming apparatus, and configured to conduct steering logic calculations based on the at least one sample measurement, the steering logic calculations including using the received signal strength measured on the first Wi-Fi radio band-to estimate a received signal strength on a second Wi-Fi radio band,
    wherein the at least one sample measurement is based on information obtained by the gateway steering controller from the content streaming apparatuses, and the steering logic calculations are compared against predetermined thresholds, and
    the gateway steering controller provides an instruction to steer the client device to the first Wi-Fi radio band or the second Wi-Fi radio band of one of the content streaming apparatuses based on a difference between the steering logic calculations and the predetermined thresholds.

2. The wireless gateway as recited by claim 1, wherein the gateway steering controller is configured to initiate steering logic following a connection of the content streaming apparatus with the client device.

3. The wireless gateway as recited by claim 1, wherein the sample measurement includes received signal strengths (RSSI), and
    the content streaming apparatus comprises a steering client configured to perform at least one sample measurement including RSSI which is transmitted to the gateway steering controller.

4. The wireless gateway as recited by claim 1, wherein traffic flow through the content streaming apparatus is monitored by the wireless gateway based on a capacity threshold, and
    wherein when the traffic flow through to the content streaming apparatus is greater than a first percentage of the capacity threshold, the content streaming apparatus is selected for band steering thereby causing the content streaming apparatus to communicate with a higher or lower frequency.

5. The wireless gateway as recited by claim 1, wherein traffic flow through the content streaming apparatus is monitored by the wireless gateway based on a capacity threshold, and
    wherein when the traffic flow through to the content streaming apparatus is greater than a second percentage of the capacity threshold, the content streaming apparatus is selected for steering from the content streaming apparatus to another content streaming apparatus.

6. The wireless gateway as recited by claim 1, wherein the wireless gateway and the content streaming apparatus are linked by a security communications link.

7. The wireless gateway as recited by claim 1, wherein the wireless gateway is configured to recognize a low signal strength between the client device and the content streaming apparatus and steer the client device from the content streaming apparatus to another content streaming apparatus, and wherein the low signal strength is less than −70 dBm, as measured by RSSI.

8. The wireless gateway as recited by claim 1, wherein the wireless gateway is configured to steer the client device from one content streaming apparatus to another and steer the client device onto a different bandwidth.

9. The wireless gateway as recited by claim 1, wherein the wireless gateway is configured to communicate with associated content streaming apparatuses and one or more non-associated content streaming apparatuses, and
    wherein the gateway steering controller is configured to steer the client device from one content streaming apparatus to another, associated or non-associated.

10. A content streaming apparatus comprising:
    an input for receiving an input signal;
    a wireless controller configured to communicate via wireless with a client device, and receive from the client device a streaming session request for streaming of requested content;
    at least one tuner;
    a controller configured to establish a streaming session with the client device via the wireless controller, and send the requested content to the client device in the streaming session; network connection circuitry; and
    a gateway steering controller configured to determine whether to steer the client device to another content streaming apparatus based on at least one sample measurement of received signal strength on a first Wi-Fi radio band between the client device and the content streaming apparatus and at least one other content streaming apparatus, and configured to conduct steering logic calculations based on the at least one sample measurement, the steering logic calculations using the received signal strength measured on the first Wi-Fi radio band to estimate a received signal strength on a second Wi-Fi radio band,
    wherein the at least one sample measurement is based on information obtained by the gateway steering controller from the content streaming apparatuses, and steering logic calculations are compared against predetermined thresholds, and the gateway steering controller provides an instruction to steer the client device to the first Wi-Fi radio band or the second Wi-Fi radio band of one of the content streaming apparatuses based on a difference between the steering logic calculations and the predetermined thresholds.

11. The content streaming apparatus as recited by claim 10, wherein the gateway steering controller is configured to initiate steering logic following connection of the content streaming apparatus with the client device.

12. The content streaming apparatus as recited by claim 10, wherein the sample measurement includes received signal strengths (RSSI), and
    the content streaming apparatus comprises a steering client configured to perform at least one sample measurement including RSSI which is transmitted to the gateway steering controller.

13. The content streaming apparatus as recited by claim 10, wherein traffic flow through the content streaming apparatus is monitored by the gateway steering controller based on a capacity threshold, and
    wherein when the traffic flow through to the content streaming apparatus is greater than a first percentage of the capacity threshold, the content streaming apparatus is selected for band steering thereby causing the content streaming apparatus to communicate with a higher or lower frequency.

14. The content streaming apparatus as recited by claim 10, wherein traffic flow through of the content streaming apparatus is monitored by the wireless gateway based on a capacity threshold, and
wherein when the traffic flow through to the content streaming apparatus is greater than a second percentage of the capacity threshold, the content streaming apparatus is selected for steering from the content streaming apparatus to another content streaming apparatus.

15. The content streaming apparatus as recited by claim 10 further comprising a blacklist adapted to disassociate a STA with a current AP or frequency band.

16. The content streaming apparatus as recited by claim 15, wherein a blacklisting procedure minimizes searching of APs for band steering.

17. The content streaming apparatus as recited by claim 10, wherein the predetermined thresholds comprise:
a. A1, comprising a threshold below which steering from an existing content streaming apparatus connection is considered configurable, with default placeholder of −75 dBm;
b. A2, comprising a minimum allowed delay since last steering occurrence configurable, with default placeholder of 30 s;
c. A3, comprising traffic throughput below which steering is allowed, configurable with default placeholder of 100 Kbps;
d. Idle time;
e. A4, comprising signal strength threshold above which steering to a new content streaming device should be considered, configurable, with default of −50 dBm; and
f. A5, a maximum period allowed for steering occurrence, configurable with default of 5 s.

18. A method for steering a client device between content streaming apparatuses, the method comprising:
establishing a connection between a client device and one or more content streaming apparatuses;
performing, with a gateway steering controller, at least one sample measurement of received signal strength on a first Wi-Fi radio band between the client device and each content streaming apparatus; and
conducting steering logic calculations based on the least one sample measurement, the steering logic calculations including using the received signal strength measured on the first Wi-Fi radio band to estimate a received signal strength on a second Wi-Fi radio band,
wherein the at least one sample measurement is based on information obtained by the gateway steering controller from the content streaming apparatuses, and the steering logic calculations are compared against predetermined thresholds, and
the gateway steering controller provides an instruction to steer the client device to the first Wi-Fi radio band or the second Wi-Fi radio band of one of the content streaming apparatuses based on a difference between the steering logic calculations and the predetermined thresholds.

19. The method as recited by claim 18, wherein steering logic is configured to commence following establishment of a security communications link.

20. One or more non-transitory computer readable media having instructions operable to cause one or more processors to perform operations comprising:
establishing a connection between a client device and one or more content streaming apparatuses;
performing, with a gateway steering controller, at least one sample measurement of received signal strength on a first Wi-Fi radio band from the client device to each content streaming apparatus; and
conducting steering logic calculations based on the at least one sample measurement, the steering logic calculations including using the received signal strength measured on the first Wi-Fi radio band to estimate a received signal strength on a second Wi-Fi radio band,
wherein the at least one sample measurement is based on information obtained by the gateway steering controller from the content streaming apparatuses, and the steering logic calculations are compared against predetermined thresholds, and
the gateway steering controller provides an instruction to steer the client device to the first Wi-Fi radio band or the second Wi-Fi radio band of one of the content streaming apparatuses based on a difference between the steering logic calculations and the predetermined thresholds.

* * * * *